(No Model.)
T. J. BARROW.
CAR BRAKE.
No. 496,245. Patented Apr. 25, 1893.
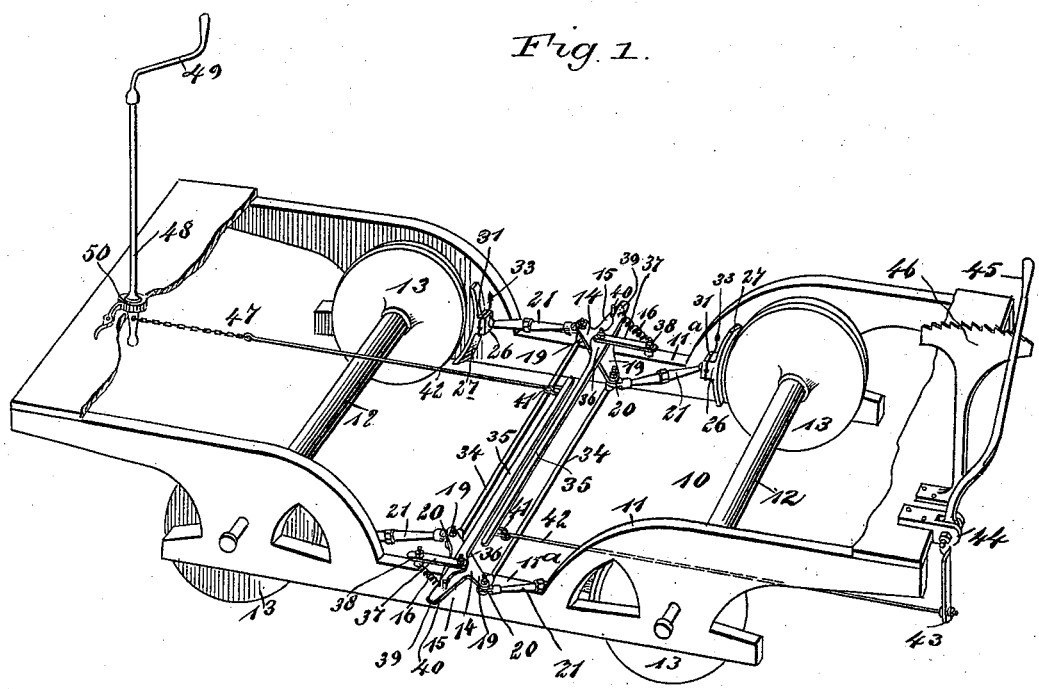
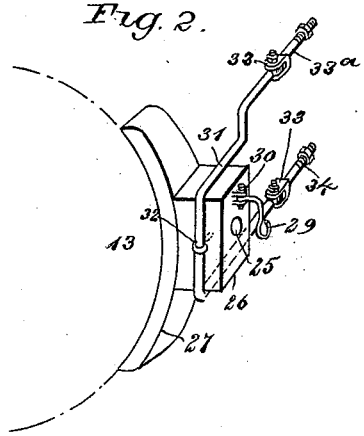
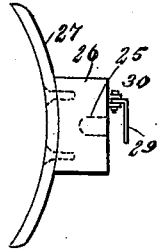
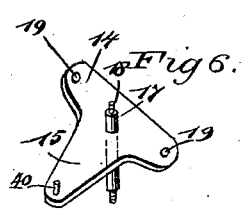
WITNESSES:
Paul Johst
C. Sedgwick
INVENTOR
T. J. Barrow
BY Munn & Co.
ATTORNEYS.

UNITED STATES PATENT OFFICE.

THADDEUS J. BARROW, OF DULUTH, MINNESOTA.

CAR-BRAKE.

SPECIFICATION forming part of Letters Patent No. 496,245, dated April 25, 1893.

Application filed July 19, 1892. Serial No. 440,501. (No model.)

*To all whom it may concern:*

Be it known that I, THADDEUS J. BARROW, of Duluth, in the county of St. Louis and State of Minnesota, have invented a new and Improved Car-Brake, of which the following is a full, clear, and exact description.

My invention relates to improvements in car brakes, and especially to brakes which are adapted to street railway cars, and the object of my invention is to produce a simple and reliable brake which will occupy but little space beneath the car, and which has a series of independent shoes so that in case one or more get loose, the others will do efficient breaking, and which is provided with a simple lever mechanism by means of which the brake shoes may be set with great rigidity upon the wheels so as to bring the car quickly under the control of the brakeman.

To this end, my invention consists in certain features of construction and combinations of parts, which will be hereinafter described and pointed out in the claims.

Reference is to be had to the accompanying drawings forming a part of this specification, in which similar figures of reference indicate corresponding parts in all the views.

Figure 1 is a broken perspective view of a car truck provided with my improved brake. Fig. 2 is an enlarged detail view of one of the brake shoes, showing the means of suspending it. Fig. 3 is a side elevation of the same. Fig. 4 is a detail view, partly in longitudinal section, of the brake arms. Fig. 5 is a detail view of one of the brake levers; and Fig. 6 is a detail perspective view of one of the three-armed levers of the brake and its central pivot.

The car truck 10, may be of any approved form, and is provided with a frame 11, and the usual axles 12 and wheels 13. The truck frame 11, as shown in the drawings, is provided on opposite sides and near the center with flat portions 11ª, carrying a cross frame 14ª, to the top of which are pivoted the three-armed levers 14, each lever having its middle arm 15, secured to a spiral spring 16, the opposite end of which is secured to the truck frame, and the tension of the spring is such as to tilt the lever and normally hold the brake shoes away from the wheels. The three-armed levers are journaled on sleeves 17, which are held in place by fastening bolts 18, adapted to be secured to the frame. The oppositely-extending arms 19, of the three-armed levers are arranged nearly at right angles to the arms 15, and the arms 19 have their free ends pivoted, as shown at 20, to the brake arms 21, which extend forward and backward from the brake mechanism held between the wheels so as to connect with the several brake shoes. The inner ends of the arms 21, are screw-threaded, as shown at 23, and these threaded ends are screwed into sockets 22, which are pivoted to the three-armed levers, and this arrangement provides for adjusting the length of the brake arms so that they may press the brake shoes firmly upon the wheels. The outer ends of the brake arms 21, terminate in balls 24, which are adapted to enter sockets 25 in the blocks 26, which blocks are produced upon the backs of the brake shoes 27, these being adapted to fit the tread of the car wheels, and the brake shoes and blocks may be of any approved construction. Each brake arm 21, has an annular recess 28, near its outer end, which receives a supporting link 29, which is of an elbow shape, as shown in Fig. 2, and which is hinged at its upper end, as shown at 30, to the brake block 26. This arrangement prevents the accidental displacement of the brake arm, and permits the necessary lateral movement of the arm, but other means may be provided for connecting the arm to the brake block. Each brake block 26 is secured to a bail 31, which extends around one side of the brake block, and is secured thereto by a screw-eye 32, or its equivalent, as shown in Fig. 2, and the ends of the bail are pivoted, as shown at 33 to bolts 33ª, which are held in the truck frame. This arrangement permits the brake shoes to swing out and in from the wheels, and as the brake arm may move laterally in relation to the brake, it will be seen that the shoes and the connected mechanism have all necessary movement. The free ends of the arms 19 of the three-armed levers 14, on opposite sides of the truck are connected together by rods 34, as shown in Fig. 1, so that when one of the three-armed levers is tilted the others will be tilted also, and the brake shoes on both sides of the car will have a similar and co-instantaneous movement. Extending transversely beneath the car and opposite the three-armed levers 14, are oppositely arranged levers 35, which at their points of fulcrum are widened at 36 to give them the necessary strength. The levers are fulcrumed on the pivots of the three-armed levers 14, and the levers are braced by braces 37, which are also secured to the fulcrums of the levers, and which are pivoted at their opposite ends to the adjacent portion of the truck frame 11. The short ends of the levers 35 are held to engage pins 40, on the arms 15, of the three armed levers 14. It will thus be seen that by swinging the levers 35, the three-armed levers 14 may be also swung upon the pivots so as to press the arms 21 outward and force the brake shoes against the wheels, and by reference to Fig. 1, it will be seen that the connection between the three-armed levers and the brake arms 21, forms practically a toggle joint, so that when the levers 14 are oscillated, the brake shoes will be applied with great power. The free ends of the levers 35 are provided with staples 41 or their equivalents, and these connect with brake rods 42, which extend longitudinally beneath the car, and connect with operating lever mechanism at the ends of the car.

In Figure 1, I have shown two forms of mechanism for operating the brake rods and levers to illustrate the fact that any desired kind of a lever may be used. As shown at the right hand of the drawings in Fig. 1, the rod 42 is pivoted, as shown at 43, to the lower end of a lever 45, which oscillates in a bearing 44, and moves over a common form of fastening quadrant 46. It will be seen that by swinging the lever 45, the rod 42 may be pulled, and the lever 35 with which it is connected, operated. At the opposite end of the car a brake rod 42 is shown connected by means of a chain 47, with the ordinary vertical shaft 48, which is journaled in the car platform and has an operating crank 49 at its upper end. The shaft 48 has also the usual ratchet wheel and pawl to prevent it from being turned back. By turning the shaft 48, the chain 47 may be wound upon it, and the lever 35 with which it is connected, operated.

It will be seen that when either of the levers 35 are operated, the connected three-armed lever will be swung, and the connecting rods 34 extending between the two three-armed levers will cause them both to be moved in unison, and the four brake shoes will be simultaneously applied to the car wheels. It will be noticed too, that the brake shoes are operated independently of each other, that is, if one or more of them should break or become loose, the others would still operate and would serve to stop the car.

Having thus described my invention, I claim as new and desire to secure by Letters Patent—

1. A car brake, comprising three-armed levers pivoted on opposite sides of the car truck, brake shoes pivotally connected with opposite arms of the three-armed levers and adapted to press the car wheels, and operating levers fulcrumed opposite the three-armed levers and connected with one arm thereof, substantially as described.

2. A car brake, comprising three-armed levers adapted to be pivoted between the car wheels, brake shoes pivotally connected with opposite arms of the three-armed levers and adapted to press the car wheels, rods connecting the arms of the opposite three-armed levers, and a lever mechanism for oscillating the three-armed levers, substantially as described.

3. A car brake, comprising spring repressed horizontally oscillating levers pivoted between the wheels of the car, brake arms pivoted to the free ends of the oscillating levers and having a jointed connection with brake shoes adapted to fit the car wheels, cross rods connecting the opposite oscillating levers to cause them to work together and a lever mechanism for moving the oscillating levers against the resistance of their springs, substantially as described.

4. A car brake, comprising three-armed levers pivoted between the car wheels, brake arms pivoted to opposite arms of the three-armed levers, brake shoes pivotally secured to the outer ends of the brake arms, rods connecting the arms of the opposite three-armed levers, and oppositely arranged operating levers fulcrumed on the pivots of the three-armed levers and connected with the middle arms of the said levers, substantially as described.

5. The combination, with the brake-shoe and the lever mechanism for applying the shoes, of bails secured to the brake shoes and hinged at one side of the same, substantially as set forth.

THADDEUS J. BARROW.

Witnesses:
A. M. GRIFFIN,
E. C. OEILES.